Aug. 10, 1965 R. A. VELEY ETAL 3,199,917

SEAT BELT GUARD

Filed Nov. 30, 1962

INVENTORS
RONALD A. VELEY
BY IRENE P. VELEY

ATTORNEYS

United States Patent Office 3,199,917
Patented Aug. 10, 1965

3,199,917
SEAT BELT GUARD
Ronald A. Veley and Irene P. Veley, both of
713 3rd Ave., Williamsport, Pa.
Filed Nov. 30, 1962, Ser. No. 241,186
12 Claims. (Cl. 297—385)

This invention relates to a seat belt and more particularly to an automobile seat safety belt guard of the class set forth in our earlier application Serial No. 197,057, filed May 23, 1962.

Automobile seat belts, of the kind generally in use, comprise a pair of woven fabric webs each approximately four feet in length. As installed, each belt is secured by one end to an anchor which is bolted to the floor of the vehicle at a position just to the rear of the vehicle seat. The two anchors are spaced from one another a distance somewhat greater than the width of a person. Each seat belt extends from its associated anchor upwardly and forwardly through the juncture between the seat back and seat cushion. Approximately one and one-half feet of each seat belt projects through the juncture and lies on the seat cushion. At the opposite end of each belt from the anchored end, is secured a fastening means such as a buckle. A person makes use of the belts by sitting on the seat cushion between the points where the two belts emerge from between the seat cushion and the back. The person then grasps the belts and associates the belt fastening means with one another across his lap. However, because one of the belts emerges from between the seats near the edge of the seat, and because of the length of the belts, they are often not in position for the user to easily find the ends and associate the fastening means with one another. In fact, the end of the seat belt nearest the edge of the seat often lies out of sight on the vehicle floor beside the seat. This not only causes the user to waste time fumbling with the belts to find their ends, but often causes the belt ends to become soiled on the vehicle floor, be forgotten because they are out of sight or be inadvertently closed in a vehicle door.

It is therefore an object of the present invention to provide a seat belt guard that retains an associated seat belt on the vehicle seat in position for use and does not interfere with the normal operation of a seat belt during the use thereof.

It is another object of the present invention to provide a seat belt guard having a flexible finger that is slidably positioned within an integral sleeve or pocket on a seat belt to retain the seat belt in a use position on the vehicle seat regardless of whether the finger is fully within the pocket or partially withdrawn from it.

It is a further object of the present invention to provide a seat belt guard which lies flat on the vehicle seat, when associated with a seat belt, and does not discomfort a user who inadvertently sits on the guard.

These and other objects of this invention are more fully set forth in the detailed description which follows, reference being made to the attached drawing wherein illustrative embodiments of the present invention are shown.

Figure 3:
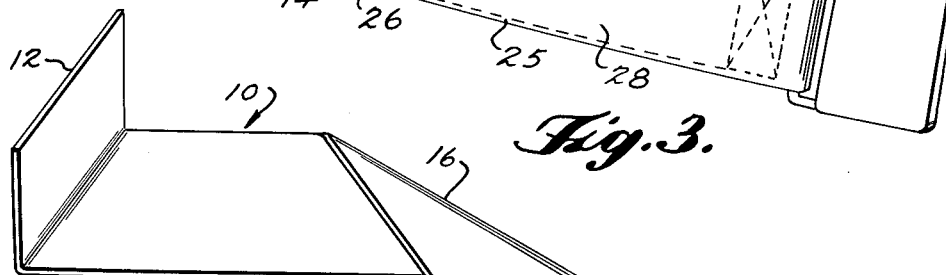
FIGURE 3 is a perspective view of the guard.

With particular reference to the drawing, a guard embodying principles of the invention is indicated at 10. A preferred embodiment of the guard 10 as best shown in FIGURE 3 comprises a sheet of somewhat stiff, although flexible thermoplastic material having the general shape of an elongated trapezoid being approximately 20 inches in length. Although polyethylene sheet is a preferred material, other thermoplastic sheets with or without inclusions such as fabric and metal may be used. In forming the guard, conventional heating means such as a hot oil bath, heated sand or hot water is used to warm the areas of the sheet to be bent. In this manner a flange 12 is formed at the wide end of the sheet by heating and bending a portion of the sheet until it extends approximately perpendicular to the sheet and transverse to the longitudinal axis thereof. Similarly, the sheet is warmed at a point near its midsection, folded over on itself and positioned so that the finger 14 defined by the diagonal bend line 16 extends in a plane parallel to the shank 18 of the guard and has an obtuse angle between its longitudinal axis and the longitudinal axis of the shank 18. The tip 20 of the finger 14 is preferably rounded so as to present a smooth sliding surface.

Figure 4:
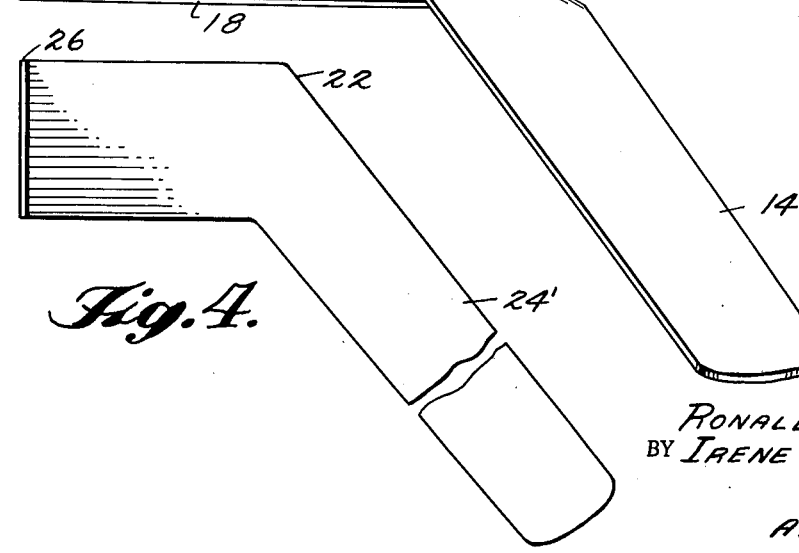
FIGURE 4 is a top plan view of another embodiment of the guard.

In the alternative embodiment shown in FIGURE 4 the sheet itself is cut so as to have a direction change at 22 defining a finger 24', a flange 26 is formed on the guard as above. This embodiment is attractive in that it is more flat than the one shown in FIGURE 4 and has one less fabrication step. However, it necessitates more wastage in the sheet from which it is cut and the area 22 is not quite so strong as the bend line 16.

Figure 1:
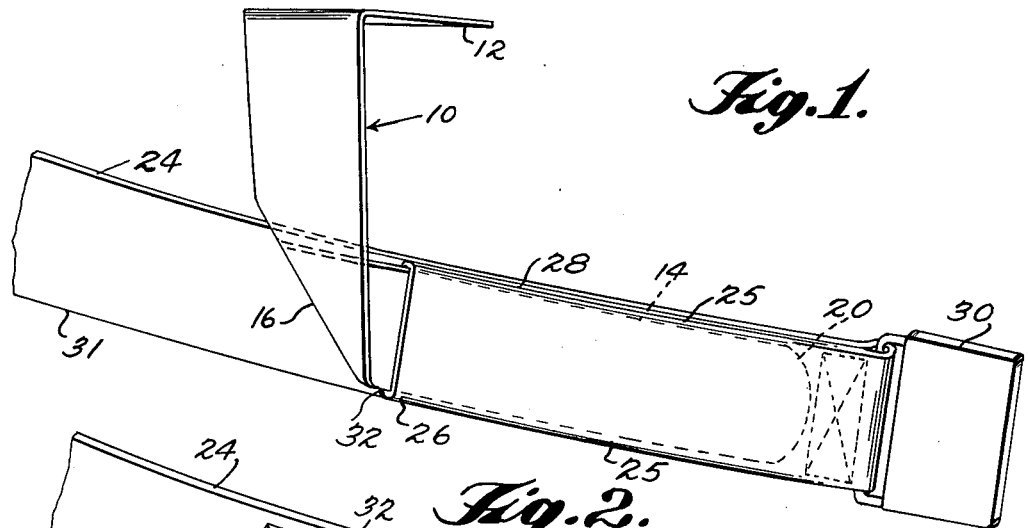
FIGURE 1 is a fragmentary perspective bottow view of a seat belt and guard of the invention, the guard extending the length of the belt sleeve or pocket.
Figure 2:
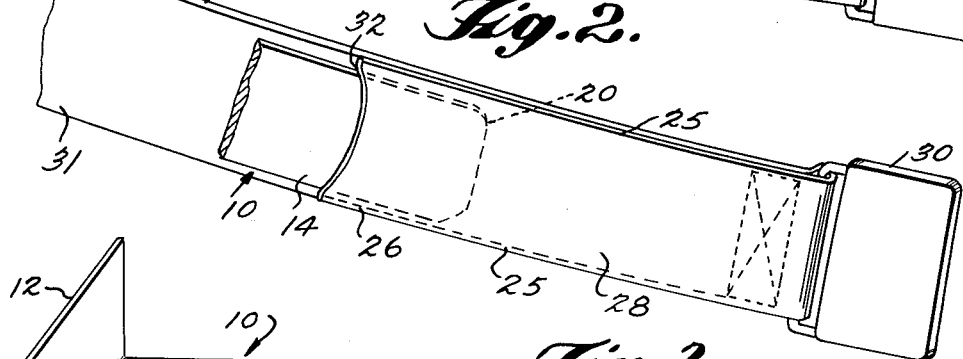
FIGURE 2 is a fragmentary perspective bottom view of the seat belt and guard of FIGURE 1, the guard partially withdrawn from the belt sleeve or pocket.

As best shown in FIGURES 1 and 2 the seat belt 24 associated with the guard has secured on the under side thereof a strip 26 of material similar to the seat belt material, although a lighter weight of material may be used. The strip is secured to the belt as by stitching 25 which extends along each edge of the belt 24 and strip 26 so as to form a sleeve or pocket 28 having a length approximately equal to the length of a finger 14 or 24. The pocket 28 is closely adjacent the end of the seat belt which has a buckle 30 secured thereto.

In use the end (not shown) of the seat belt 24 which extends from the portion designated 31 is conventionally secured to an anchor (not shown) so that the opening 32 of the pocket 28 is on the underside of the belt 24 as it lies on the seat cushion. The guard 10 is positioned on the seat cushion, adjacent where the seat belt emerges from between the cushion and the back, and the flange 12 is slipped between the cushion and back. The flange 12 may then be secured to the back of the seat or cushion by any suitable means. The shank 18 extends forwardly from the flange 12 between the cushion and back portion and the finger 14 lies flat on the seat. The guard shown is used on the seat belt at the user's left, so that the belt is directed by the guard toward the user. Also, when the user is on the left side of a vehicle seat the guard 10 directs the associated seat belt away from the side edge of the seat. A guard of similar construction can be provided for the right side seat belt. The right guard is a mirror image of the left guard.

To associate the guard 10 with the belt 24 after each has been installed, the finger 14 is flexed and the tip 20 is inserted through the opening 32 and into the sleeve or pocket 28. The finger 14 is then longitudinally advanced in the pocket until the tip 20 abuts the inner end of the pocket. If the embodiment of the guard shown in FIGURE 4 is used instead of the one shown in FIGURES 1–3, it is associated with the seat and seat belt 10 in the same manner.

As a person desires to use the seat belt having the guard system embodying the invention, he seats himself between two belts and grasps the ends of the belts which are held in position on the seat by the guards 10. The user pulls the two belts toward one another causing the fingers to partially withdraw from the pockets as shown in FIGURE 2. When the belts meet the user fastens the two buckles or other cooperating securing means to one another. Because of the respective lengths of the belts, pockets and fingers on the two belts (or the belt, pocket and finger if a guard 10 is used only on the side of the user nearest the seat edge) the finger is never entirely withdrawn from the sleeve or pocket during normal use and the associated seat belt is always directed across the seat cushion surface in position for use regardless of whether the finger is fully positioned in the sleeve or pocket as shown in FIGURE 1, or partially withdrawn as shown in FIGURE 2. Thus the guard system of the invention allows the seat belt to be lifted up from a flat position on the seat by flexing the finger transversely, and allows the seat belt to be extended and retracted by sliding it into greater and lesser coextension with the finger. The seat belt is restrained by the finger from moving into other positions not necessary for belt use. The seat belt is retained flat on the seat when not in use and is directed toward the other seat belt in position for easy finding when one wishes to associate the two belts in use.

Although two configurations of the guard of the invention have been shown for use with the seat belt having a sleeve or pocket thereon, it should be clear that other configurations are possible.

The two embodiments of the invention have been shown to illustrate the principles of the invention. It is obvious that many modifications of these embodiments are possible without departing from the principles of the invention and that therefore the invention is limited only by the spirit and scope of the appended claims.

What is claimed is:

1. A seat belt guard system comprising an elongated flexible guard member and a seat belt, said seat belt having a pocket secured thereon adjacent one end of the belt, so as to have an opening directed away from said seat belt end, the flexible guard being secured by one end thereof to a vehicle seat, the flexible guard being positioned within the pocket and the belt being longitudinally slidable with respect to the guard member.

2. A seat belt guard system as set forth in claim 1 wherein the guard member is secured by one end thereof to a vehicle seat so as to extend forwardly from the rear of the seat cushion and inwardly from the seat cushion side edge so as to retain the associated seat belt on the seat cushion in a position for use.

3. A seat belt guard comprising an elongated strip of thermoplastic sheet material said strip having a portion adjacent one end thereof upturned so as to define a flange and said strip being folded over on itself midway between the ends thereof so as to define a guiding finger extending parallel to the plane of the unfolded strip at an obtuse angle to the unfolded strip.

4. A seat belt guard system comprising a seat belt and a guard member, said seat belt having an elongated strip secured thereto adjacent one end thereof so as to define a sleeve with the belt, the sleeve extending in the same longitudinal direction as the belt and having an opening at the end of the sleeve furthest from said belt end; the guard comprising a flexible finger entering the sleeve through the opening therein, said finger being securable to a vehicle seat by a flange integrally formed adjacent one end of the finger, said finger being longitudinally slidable in the sleeve so as to confine possible movements of the belt to positions necessary for belt use.

5. A seat belt guard system including a seat associated member comprising a flexible finger and a belt associated member comprising an elongated sleeve, a portion of the length of the flexible finger being slidably positioned longitudinally within the belt associated sleeve, the finger also being secured to a vehicle seat so as to extend forwardly from the rear of the seat cushion and inwardly from the side edge of the seat, whereby the belt is retained by the flexible finger in a position for use.

6. A seat belt including an end for receiving a buckle; and means defining a relatively long pocket on said belt extending longitudinally thereon from adjacent said buckle end; an elongated flexible finger received within said pocket; said finger being stiffer than said belt and pocket, whereby said finger substantially reduces the susceptibility of said belt and pocket to twisting and bending.

7. A seat belt as set forth in claim 6 including means defining an opening into said pocket spaced a substantial distance from said belt end.

8. A seat belt as set forth in claim 7 wherein the pocket is defined by one surface of the belt and by an elongated strip of material secured to the belt along the longitudinal edges of the strip and the belt and along one edge of the strip adjacent the buckle end of the belt.

9. A seat belt as set forth in claim 7 wherein the strip of material is stitched to the belt.

10. A seat belt as set forth in claim 6 wherein the finger is composed of thermoplastic material.

11. A seat belt as set forth in claim 6 wherein the flexible finger is substantially as long as said pocket and has a securement portion extending therefrom and outwardly from the pocket, said portion being arranged to be secured adjacent a vehicle seat so that the pocket carrying portion of the belt lies flat on the seat portion of the vehicle seat.

12. A seat belt as set forth in claim 11 wherein the flexible finger extends at an obtuse angle from the securement portion whereby the pocket portion of the belt is directed laterally inwardly from the side edge of the vehicle seat on which it extends.

References Cited by the Examiner
UNITED STATES PATENTS

| 716,253 | 12/02 | Lebens | 24—182 |
| 1,687,826 | 10/28 | Burkhard | 297—253 |
| 2,833,344 | 5/58 | Lucht | 297—253 |
| 2,855,215 | 10/58 | Sheren | 297—385 |
| 3,096,122 | 7/63 | Connell | 297—385 |

FRANK B. SHERRY, *Primary Examiner.*